J. Vaughan,
Making Fellies.

N.º 18,651.  Patented Nov. 17, 1857.

UNITED STATES PATENT OFFICE.

JACOB VAUGHAN, OF EXCHANGEVILLE, PENNSYLVANIA.

METHOD OF ADJUSTING BAND-SAWS TO CIRCULAR STOCKS.

Specification of Letters Patent No. 18,651, dated November 17, 1857.

*To all whom it may concern:*

Be it known that I, JACOB VAUGHAN, of Exchangeville, in the county of Mercer and State of Pennsylvania, have invented a new and Improved Machine for Cutting Fellies for Wheels; and I do hereby declare that the following is a full, clear, and exact description of the same, reference being had to the annexed drawings, making a part of this specification, in which—

Figure 1:
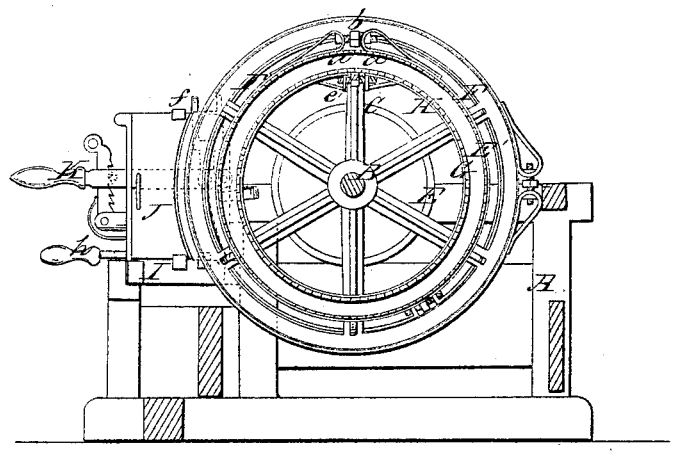
Figure 2:
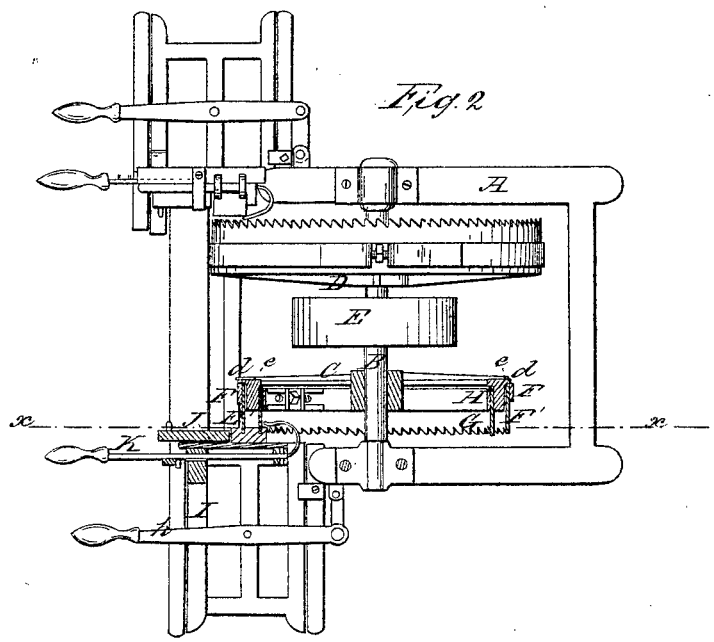

Figure 1, is a vertical section of my improvement; (*x*) (*x*) Fig. 2, showing the plane of section. Fig. 2 is a plan or top view of ditto, the wheel being bisected.

Similar letters of reference indicate corresponding parts in the two figures.

My invention consists in having two band saws attached, one to the outer and the other to the inner periphery of the rim of a wheel, the saws being attached to the rim by means of bands or straps, and the outer saw expanded or contracted by interposing bands between the saw and the periphery of the wheel, the whole being arranged as will be hereinafter fully shown and described whereby fellies may be sawed with facility and the depth or thickness varied as occasion may require.

To enable those skilled in the art to fully understand and construct my invention I will proceed to describe it.

A represents a frame which may be constructed of wood and in any proper manner to support the working parts.

B represents a shaft which is placed on the upper part of the frame A. On this shaft two wheels C, D, are placed, and a driving pulley E is placed on the shaft between the two wheels. One wheel C is considerably smaller than the other D.

E′ represents what may be termed a band saw. It is formed of a strip of steel plate having teeth cut on one edge. This plate is placed around the outer surface of the rim of the wheel C, and is secured thereon by a metallic band F, the ends of which are looped and have nuts (*a*) secured in them, in which nuts a right and left screw rod (*b*) works. By turning the rod (*b*) in the proper direction, the two ends of the band may be drawn toward each other and the saw E′ firmly secured on the wheel. The diameter of the saw E may be increased or diminished as desired by interposing bands (*c*), one or more, between the saw and the rim of the wheel. The saw E′ and also the bands (*c*) (their back edges) rest or bear against a shoulder (*d*) on the outer surface of the rim of the wheel. The saw E, (the cutting edge) extends or projects some distance beyond the side of the rim.

G is a band saw constructed precisely similar to the saw E′. The saw G is secured to the inner side of the rim of the wheel C by a metallic band H which is arranged similar to the band F, said band H securing the saw G to the inner surface of the rim by being distended or expanded by turning a screw rod (*e*) which is precisely similar to the rod (*b*). The two saws E′ G project an equal distance out from one side of the wheel C.

On the frame A and at one side of the wheel C a sliding carriage I is placed, and to the inner end of this carriage a vertical bed J is secured. The bed J has movable dogs (*f*) applied to it at its upper end, stationary dogs being at the lower end of the bed. The movable dogs *f* may be connected with a lever K by which said dogs may be raised and lowered.

The staff or bolt from which the fellies are cut is secured against the bed J by means of the dogs (*f*). And when motion is given the wheel C the bolt is moved or fed against the two band saws by moving the carriage I toward the saws by means of a lever (*h*). The two saws cut the fellies from the bolt. The depth of the fellies may be varied by interposing a greater or less number of bands (*c*) between the the saw E′ and wheel C. Fellies of a greater or less size, or those forming segments of different sized circles may be cut by having wheels C of different diameters placed on the shaft.

In Fig. 2 the wheel D is merely a duplicate of C it being merely larger. The wheel D has band saws attached to it the same as those on wheel C. By this method of securing the saws E′, and G, to the wheel, the employment of bolts and screws passing through the saws at intervals, around the wheel, is avoided. All perforation of the saw-plates, to receive said bolts, is therefore unnecessary and the full strength of the saw-blades always retained. This method is also a very cheap way of attaching the saws and facilitates their removal for sharpening, changes, etc.

I am aware that sliding carriages have been used for feeding bolts to saws, and bolts have also been dogged substantially in the same way as that herein shown; band saws or their equivalents have also been previously used; but I am not aware that band saws have been secured to a rotating wheel in the manner herein shown and described. I do not claim, therefore, the means employed for feeding the bolt to the saws, nor do I claim band saws irrespective of the means employed for securing them to the wheel; but,

Having thus described my invention, what I claim as new, and desire to secure by Letters Patent, is:

Securing the saws E', G, to the wheel C, by means of the expanding and contracting bands E, H, whereby every part of the saws are firmly screwed to said wheel without perforating the saw or making use of intermediate bolts and screws, all as herein set forth.

JACOB VAUGHAN.

Witnesses:
 IRA M. CONDIT,
 JAMES DUNN.